United States Patent
Agarwal et al.

(10) Patent No.: US 11,488,058 B2
(45) Date of Patent: *Nov. 1, 2022

(54) VECTOR GENERATION FOR DISTRIBUTED DATA SETS

(71) Applicant: Palantir Technologies Inc., Palo Alto, CA (US)

(72) Inventors: Rahul Agarwal, New York, NY (US); Daniel Erenrich, Mountain View, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 786 days.

This patent is subject to a terminal disclaimer.

(21) Appl. No.: 16/426,865

(22) Filed: May 30, 2019

(65) Prior Publication Data

US 2020/0005181 A1 Jan. 2, 2020

Related U.S. Application Data

(63) Continuation of application No. 15/655,401, filed on Jul. 20, 2017, now Pat. No. 10,373,078.

(Continued)

(51) Int. Cl.
*G06N 20/00* (2019.01)
*G06F 17/16* (2006.01)
(Continued)

(52) U.S. Cl.
CPC ............. *G06N 20/00* (2019.01); *G06F 17/16* (2013.01); *G06F 17/10* (2013.01); *G06F 17/11* (2013.01); *G06F 17/14* (2013.01)

(58) Field of Classification Search
CPC ...... G06N 99/005; G06N 5/025; G06N 7/005; G06K 9/6256; G06K 9/6269;
(Continued)

(56) References Cited

U.S. PATENT DOCUMENTS

| 5,418,950 A | 5/1995 | Li et al. |
| 5,428,737 A | 6/1995 | Li et al. |

(Continued)

FOREIGN PATENT DOCUMENTS

| DE | 102014103482 A1 | 9/2014 |
| EP | 1647908 A2 | 4/2006 |

(Continued)

OTHER PUBLICATIONS

Tracy et al. "An Agent-based Approach to Inference Prevention in Distributed Database Systems", ICTAI, 2002, pp. 10.*

(Continued)

*Primary Examiner* — Li Wu Chang
(74) *Attorney, Agent, or Firm* — Schwegman Lundberg & Woessner, P.A.

(57) ABSTRACT

In various example embodiments, a vector modeling system is configured to access a set of data distributed across client devices and stored in a structured format. The vector modeling system determines vector parameters and vector templates suitable for the set of data and transforms the set of data from the structured format into a second format including one or more vectors based on one or more transformation strategies. The vector modeling system stores the transformed data and performs machine learning analysis on the vector.

18 Claims, 10 Drawing Sheets

Related U.S. Application Data

(60) Provisional application No. 62/375,368, filed on Aug. 15, 2016.

(51) Int. Cl.
*G06F 17/10* (2006.01)
*G06F 17/11* (2006.01)
*G06F 17/14* (2006.01)

(58) Field of Classification Search
CPC .. G06K 9/4609; H04N 19/573; H04N 19/593; H04N 19/61; G06F 17/21; G06F 9/4448; H04L 2209/60; H04L 9/083; H04W 4/10
See application file for complete search history.

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Zbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,798,753 A | 8/1998 | Zhou et al. |
| 5,857,329 A | 1/1999 | Bigham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shaklb et al. |
| 6,643,613 B2 | 11/2003 | McGee et al. |
| 6,745,382 B1 | 6/2004 | Zothner |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez, Jr. et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,216,133 B2 | 5/2007 | Wu et al. |
| 7,406,592 B1 | 7/2008 | Poiyudov |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,979,424 B2 | 7/2011 | Dettinger |
| 8,073,857 B2 | 12/2011 | Sreekanth |
| 8,103,962 B2 | 1/2012 | Embley et al. |
| 8,417,715 B1 | 4/2013 | Bruckhaus |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing et al. |
| 8,639,552 B1 | 1/2014 | Chen et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,292,388 B2 | 3/2016 | Fisher et al. |
| 9,330,120 B2 | 5/2016 | Downing et al. |
| 9,348,677 B2 | 5/2016 | Marinelli |
| 9,378,526 B2 | 6/2016 | Sampson |
| 10,373,078 B1 | 8/2019 | Agarwal et al. |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels et al. |
| 2003/0212670 A1 | 11/2003 | Yalamanchi et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0126840 A1 | 7/2004 | Cheng et al. |
| 2004/0139212 A1 | 7/2004 | Mukherjee |
| 2004/0153837 A1 | 8/2004 | Preston et al. |
| 2004/0193608 A1 | 9/2004 | Gollapudi et al. |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0209085 A1 | 9/2006 | Wong et al. |
| 2006/0271838 A1 | 11/2006 | Carro |
| 2006/0271884 A1 | 11/2006 | Hurst |
| 2006/0288046 A1 | 12/2006 | Gupta |
| 2007/0005582 A1 | 1/2007 | Navratil et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaithesswaran et al. |
| 2009/0248721 A1 | 10/2009 | Burton et al. |
| 2009/0282068 A1 | 11/2009 | Shockro et al. |
| 2009/0299830 A1 | 12/2009 | West et al. |
| 2010/0008573 A1 | 1/2010 | Tajbakhsh et al. |
| 2010/0011282 A1 | 1/2010 | Dollard et al. |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0313119 A1 | 12/2010 | Baldwin et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0145401 A1 | 6/2011 | Westlake |

(56) References Cited

U.S. PATENT DOCUMENTS

| | | | |
|---|---|---|---|
| 2011/0208822 | A1 | 8/2011 | Rathod |
| 2011/0252282 | A1 | 10/2011 | Meek et al. |
| 2011/0258216 | A1 | 10/2011 | Supakkul |
| 2011/0270871 | A1 | 11/2011 | He et al. |
| 2011/0321008 | A1 | 12/2011 | Jhoney et al. |
| 2012/0078595 | A1 | 3/2012 | Balandin et al. |
| 2012/0102022 | A1 | 4/2012 | Miranker et al. |
| 2012/0159449 | A1 | 6/2012 | Arnold et al. |
| 2012/0173381 | A1 | 7/2012 | Smith |
| 2012/0174057 | A1 | 7/2012 | Narendra et al. |
| 2012/0188252 | A1 | 7/2012 | Law |
| 2012/0204098 | A1 | 8/2012 | Venkata |
| 2012/0284719 | A1 | 11/2012 | Phan et al. |
| 2013/0007818 | A1* | 1/2013 | Kalidindi ........... H04N 21/4722 725/87 |
| 2013/0024268 | A1 | 1/2013 | Manickavelu |
| 2013/0024731 | A1 | 1/2013 | Shochat et al. |
| 2013/0054551 | A1 | 2/2013 | Lange |
| 2013/0086482 | A1 | 4/2013 | Parsons |
| 2013/0096968 | A1 | 4/2013 | Van Pelt et al. |
| 2013/0198624 | A1 | 8/2013 | Aymeloglu et al. |
| 2013/0225212 | A1 | 8/2013 | Khan |
| 2013/0226944 | A1 | 8/2013 | Baid et al. |
| 2013/0232220 | A1 | 9/2013 | Sampson |
| 2014/0012886 | A1 | 1/2014 | Downing et al. |
| 2014/0074888 | A1 | 3/2014 | Potter et al. |
| 2014/0011561 | A1 | 4/2014 | Marinelli, III et al. |
| 2014/0108074 | A1 | 4/2014 | Miller et al. |
| 2014/0115589 | A1 | 4/2014 | Marinelli, III et al. |
| 2014/0214579 | A1 | 7/2014 | Shen et al. |
| 2014/0244388 | A1 | 8/2014 | Manouchehri et al. |
| 2015/0112641 | A1 | 4/2015 | Faraj |
| 2015/0269030 | A1 | 9/2015 | Fisher et al. |
| 2016/0026923 | A1 | 1/2016 | Erenrich et al. |

FOREIGN PATENT DOCUMENTS

| | | |
|---|---|---|
| EP | 2634745 A1 | 9/2013 |
| EP | 2743839 A1 | 6/2014 |
| EP | 2778986 A1 | 9/2014 |
| EP | 2921975 A1 | 9/2015 |
| GB | 2366498 A | 3/2002 |
| GB | 2508503 B | 1/2015 |
| GB | 2508293 B | 4/2015 |
| HK | 1194178 B | 9/2015 |
| NZ | 622485 A | 3/2015 |
| NZ | 616212 A | 5/2015 |
| NZ | 616299 A | 7/2015 |
| WO | WO-0034895 A1 | 6/2000 |
| WO | WO-2010030917 A2 | 3/2010 |
| WO | WO-2013030595 A1 | 3/2013 |

OTHER PUBLICATIONS

Zhang et al. "Video Surveillance Using a Multi-Camera Tracking and Fusion System", 2008, pp. 13.*

"A Quick Guide to UniProtKB Swiss-Prot & TrEMBL", UniProt Consortium, Ongoing and future developments at the Universal Protein Resource, (Sep. 2011), 1-2.

"A Tour of Pinboard", [Online] Retrieved from the Internet: <URL: https://pinboard.in/tour/>, (May 15, 2014), 1-6.

"U.S. Appl. No. 15/655,401, Advisory Action dated Aug. 13, 2018", 5 pgs.

"U.S. Appl. No. 15/655,401, Examiner Interview Summary dated Mar. 1, 2018", 2 pgs.

"U.S. Appl. No. 15/655,401, Final Office Action dated Apr. 18, 2018", 8 pgs.

"U.S. Appl. No. 15/655,401, Non-Final Office Action dated Dec. 6, 2017", 15 pgs.

"U.S. Appl. No. 15/655,401, Notice of Allowance dated Mar. 18, 2019", 7 pgs.

"U.S. Appl. No. 15/655,401, Response filed Mar. 6, 2018 to Non-Final Office Action dated Dec. 6, 2017", 22 pgs.

"U.S. Appl. No. 15/655,401, Response filed Jun. 15, 2018 to Final Office Action dated Apr. 18, 2018", 25 pgs.

"Delicious", [Online], Retrieved from the Internet: <URL: http://delicious.com/>, (accessed May 15, 2014), 1 pg.

"Frequently Asked Questions about Office Binder 97", [Online], Retrieved from the Internet: <URL: http://web.archive.org/web/20100210112922/http://support.microsoft.com/kb/843147>, (Accessed Dec. 18, 2006), 5 pgs.

"Java Remote Method invocation: 7—Remote Object Activation", [Online]. Retrieved from the Internet: <URL: https://docs.oracle.com/javase/7/docs/platform/rmi/spec/rmi-activation2.html, (accessed Dec. 31, 2010), 2 pgs.

"Machine Code", Wikipedia, [Online], Retrieved from the Internet: <URL: http://en.wikipedia.org/wiki/Machine code>, (Accessed Aug. 11, 2014), 1-5.

"The FASTA Program Package", fasta-36.3.4, (Mar. 25, 2011), 1-29.

Alur, Nagraj, et al., "Chapter 2: IBM InfoSphere DataStage Stages", IBM InfoSphere DataStage Data Flow and Job Design, pp. 35-137, (Jul. 1, 2008), 106 pgs.

Bae, Jinuk, et al., "Partitioning Algorithms for the Computation of Average Iceberg Queries", DaWaK2000, LNCS 1874, (2000), 276-286.

Ballesteros, Francisco, et al., "Batching: A Design Pattern for Efficient and Flexible Client/Server Interaction", Transaction on Pattern Language of Programming I, (c) Springer-Verlag Berlin Heidelberg 2009, (2009), 48-66.

Bogle, Phillip, et al., "Reducing Cross-Domain Call Overhead Using Batched Futures", SIGPLAN No. 29, 10, OOPSLA '94, (Oct. 1994), 341-354.

Bogle, Phillip, "Reducing Cross-Domain Call Overhead Using Batched Futures", Massachusetts Institute of Technology, (Submitted to the Dept. of Electrical Engineering and Computer Science in partial fulfillment of the requirement for the degree of Master of Science in Computer Science and Engineering), (1994), 1-96.

Bouajjani, Ahmed, et al., "Analysis of Recursively Parallel Programs", POPL'12, (Jan. 2012), 203-214.

Canese, Kathi, et al., "Chapter 2: PubMed: The Bibliographic Database", The NCBI Handbook, (Oct. 2002), 1-10.

Chazelle, Bernard, et al., "The Bloomier Filter: An Efficient Data Structure for Static Support Lookup Tables", Soda '04 Proceedings of the Fifteenth Annual ACMSIAM Symposium on Discrete Algorithms, (2004), 30-39.

Delcher, Arthur, et al., "Identifying Bacterial Genes and Endosymbiont DNA with Glimmer", BioInformatics, vol. 23, No. 6, (2007), 673-679.

Donjerkovic, Donko, et al., "Probabilistic Optimization of Top N Queries", Proceedings of the 25th VLDB Conference, (1999), 411-422.

Fang, Min, et al., "Computing Iceberg Queries Efficiently", Proceedings of the 24th VLDB Conference, (1998), 299-310.

Goldstein, Seth Copen, et al., "Stacks Lazy Threads: Implementing a Fast Parallel Call", Journal of Parallel and Distributed Computing, (Jan. 1996), 5-20.

Han, Jiawei, et al., "Efficient Computation of Iceberg Cubes with Complex Measures", ACM Sigmod, (May 21-24, 2001), 1-12.

Ivanova, Milena, et al., "An Architecture for Recycling Intermediates in a Column-store", Proceedings of the 35th Sigmod International Conference on Management of Data, SIGMOD '09, (Jun. 29, 2009), 309-320.

Jacques, Mathieu, "An Extensible Math Expression Parser with Plug-ins", Code Project, [Online], Retrieved from the Internet: <URL: http://www.codeproject.com/Articles/7335/An-extensible-math-expression-parser-with-plug-ins>, (Mar. 13, 2008), 1-34.

Jenks, Stephen, et al., "Nomadic Threads: A Migrating Multithreaded Approach to Remote Memory Accesses in Multiprocessors", Parallel Architectures and Compilation Techniques, (Oct. 1996), 2-11.

Kahan, J., et al., "Annotea: an open RDF infrastructure for Shared Web Annotations", Computer Networks vol. 39, No. 5, Elsevier Science Publishers B.V., Amsterdam, NL, (2002), 589-608.

Karp, Richard, et al., "A Simple Algorithm for Finding Frequent elements in Streams and Bags", ACM Transactions on Database Systems, vol. 28, No. 1, (Mar. 2003), 51-55.

(56) References Cited

OTHER PUBLICATIONS

Kitts, Paul, "Chapter 14: Genome Assembly and Annotation Process", The NCBI Handbook, (Oct. 2002), 1-21.

Leela, Krishna P, et al., "On Incorporating Iceberg Queries in Query Processors", Lecture Notes in Computer Science: Database Systems for Advanced Applications, vol. 2973, Springer Berlin Heidelberg, (2004), 431-442.

Liu, Hongyan, et al., "Methods for Mining Frequent Items in Data Streams: An Overview", Knowledge and Information Systems, vol. 26, No. 1, (Jan. 2011), 1-30.

Madden, "Chapter 16: BLAST Sequence Analysis Tool", The NCBI Handbook, (Oct. 2002), 1-15.

Mendes, Pablo, et al., "TcruziKB: Enabling Complex Queries for Genomic Data Exploration", IEEE International Conference on Semantic Computing, (Aug. 2008), 432-439.

Mizrachi, Ilene, "Chapter 1: GenBank: The Nucleotide Sequence Database", The NCBI Handbook, (Oct. 2002), 1-14.

Plasil, Frantisek, "An Architectural View of Distributed Objects and Components in CORBA, Java RMI and COM/DCOM", Software—Concepts & Tools, vol. 19, No. 1, (Jun. 1998), 14-28.

Russell, Alastair, et al., "Nitelight: A Graphical Tool for Semantic Query Construction", University of Southhampton, UK, (2008), 1-10.

Sigrist, Christian, et al., "Prosite, a Protein Domain Database for Functional Characterization and Annotation", Nucleic Acids Research, vol. 38, (2010), D161-D166.

Sirotkin, Karl, et al., "Chapter 13: The Processing of Biological Sequence Data at NCBI", The NCBI Handbook, (Oct. 2002), 1-11.

Smart, Paul, et al., "A Visual Approach to Semantic Query Design Using a Web-Based Graphical Query Designer", 16th International Conference on Knowledge Engineering and Knowledge Management (EKAW), (2008), 16 pgs.

Stamos, James, et al., "Remote Evaluation", ACM Transactions on Programming Languages and Systems, vol. 12, No. 4, (Oct. 1990), 537-565.

Wollrath, Ann, et al., "A Distributed Object Model for the Java System", Proceedings of the 2nd Conference on USENEX, Conference on Object-Orients Technologies and Systems, (Jun. 1996), 219-231.

\* cited by examiner

VECTOR GENERATION FOR DISTRIBUTED DATA SETS

PRIORITY APPLICATION

This application claims priority to and is a continuation of U.S. patent application Ser. No. 15/655,401, filed Jul. 20, 2017, which claims priority to U.S. Provisional Application Ser. No. 62/375,368, filed Aug. 15, 2016, the disclosure of which are incorporated herein in their entireties by reference.

TECHNICAL FIELD

Embodiments of the present disclosure relate generally to generation of vectors for machine learning analysis and, more particularly, but not by way of limitation, to a method of generating vectors from sets of data distributed across a plurality of client devices.

BACKGROUND

Machine learning processes are often useful in making predictions based on data sets. However, some types of data present difficulties for machine learning processes. As such, methods and systems have been developed to transform data to formats compatible with machine learning processes. These systems and methods often include integrated transformation methods with no options to tailor data transformation based on data types present in the set of data or machine learning processes to be performed on the resulting transformed data. These systems and methods are often incompatible with distribution, transforming data sets to which the systems have direct access.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example embodiments described herein disclose a vector modeling system configured to access data sets across distributed client devices, and based on the data and machine learning processes to be performed on the data, generate vectors compatible with one or more machine learning processes incorporating data from one or more of the distributed client devices. In some instances, the vector modeling system provides options for transformation strategies tailored to the set of data being transformed, the machine learning processes to be applied to the transformed data, or selectable by a user requesting the transformation. The vector modeling system may store vectors as a sparse vector reconstituting the generated vectors upon request for processing of the generated vector. In some embodiments, the vector modeling system generates vectors based on data retrieved and aggregated from a plurality of client devices. In some instances, the vector modeling system generates vectors by generating and transmitting conversion instructions to the plurality of client devices to perform distributed data transformations on one or more client devices. The conversion instructions may also enable transformations to be performed in parallel and to transmit the transformed data back to the vector modeling system for processing by machine learning processes or further generation of the received transformed data (e.g., vectors).

Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
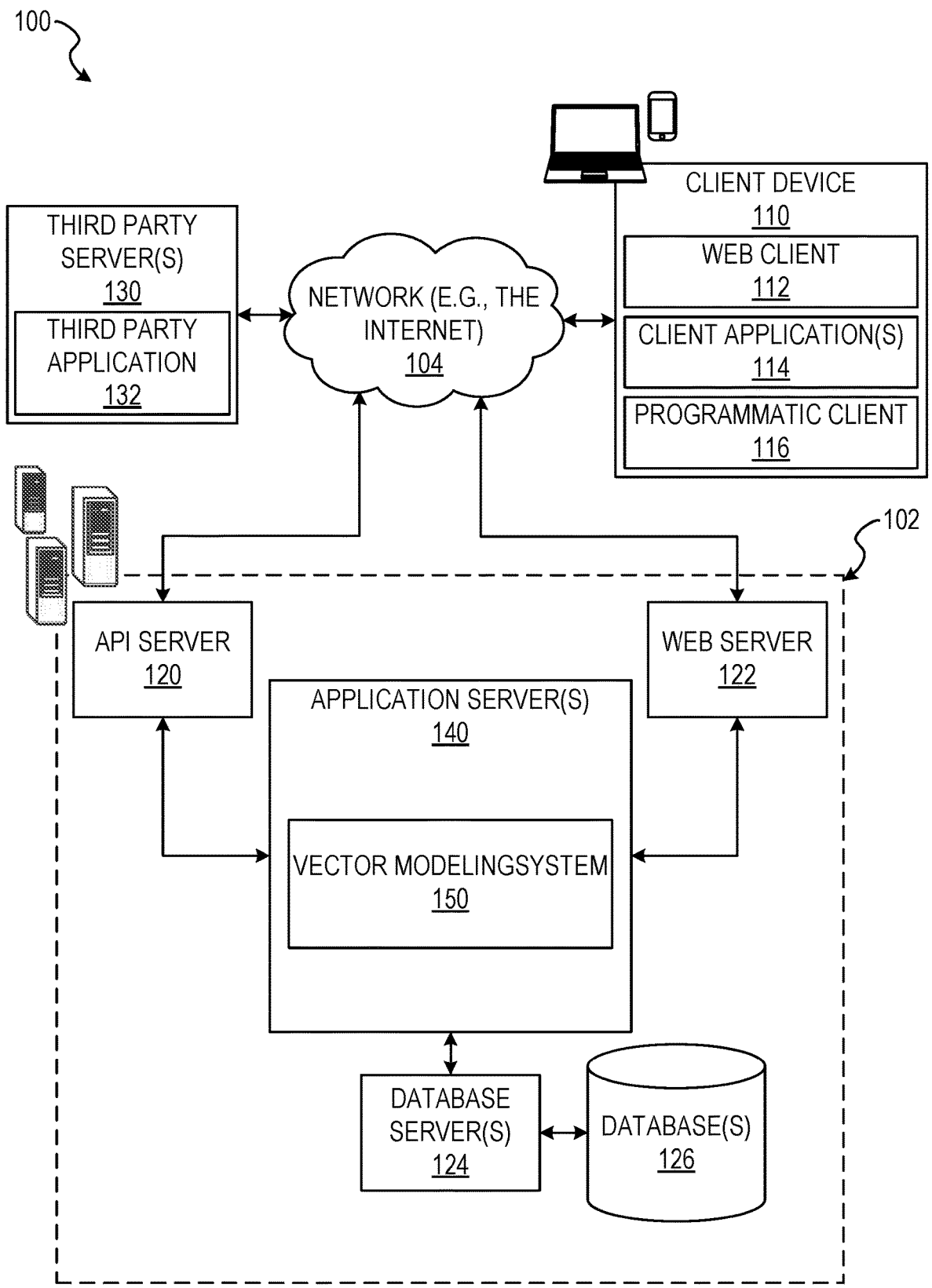
FIG. 1 is a block diagram illustrating a networked system, according to some example embodiments.

With reference to FIG. 1, an example embodiment of a high-level client-server-based network architecture 100 is shown. A networked system 102, in the example forms of a network-based recommendation system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, and the like.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems comprising a vector modeling system 150, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the networked system 102. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The vector modeling system 150 may provide functionality operable to perform various data conversion operations to generate vectors suitable for use in machine learning techniques. For example, the vector modeling system 150 may access sets of data stored in a structured format from the databases 126, the third party servers 130, the API server 120, the client device 110, and other sources. In some example embodiments, the vector modeling system 150 analyzes the set of data in to determine a vector template and one or more transformation strategies. The vector modeling system 150 generates vectors from at least a portion of the set of data based on the vector template using the one or more transformation strategies.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The vector modeling system 150 could also be implemented as standalone software programs, which do not necessarily have networking capabilities.

Additionally, a third party application 132, executing on a third party server(s) 130, is shown as having programmatic access to the networked system 102 via the programmatic interface provided by the API server 120. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
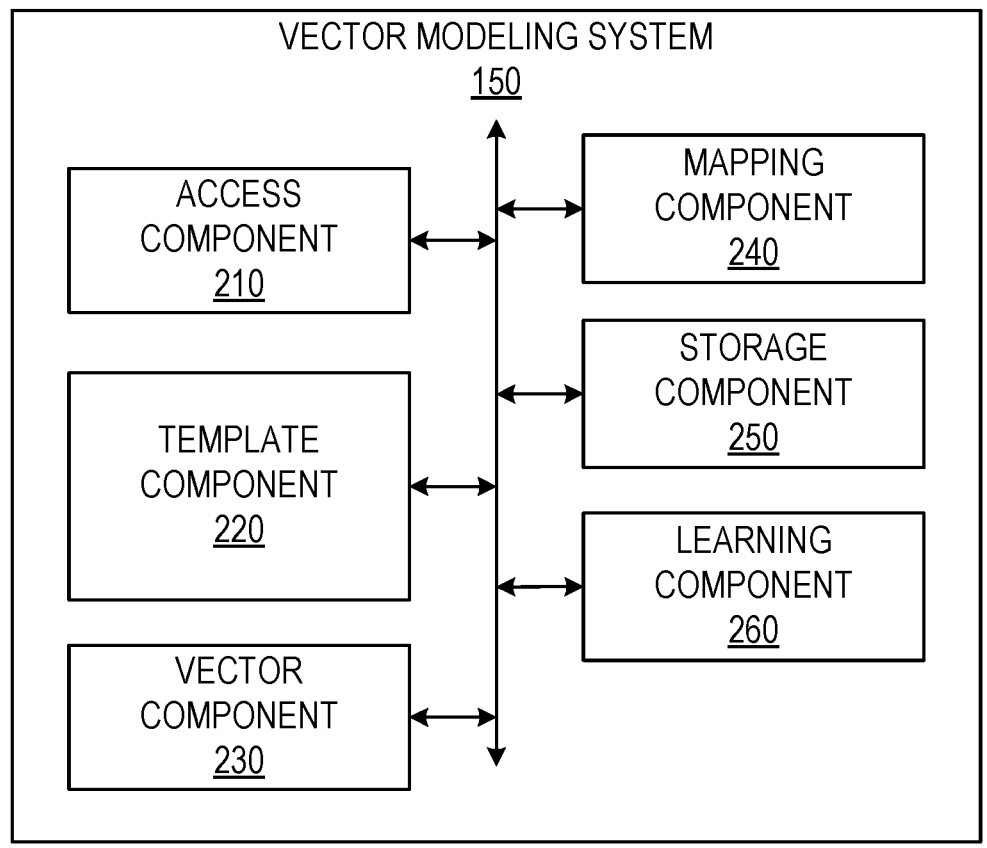
FIG. 2 is a block diagram illustrating various modules of a modeling system, according to various example embodiments.

FIG. 2 is a block diagram illustrating components of the vector modeling system 150. Components of the vector modeling system 150 configure the vector modeling system 150 to access sets of data to be transformed for machine learning analysis; transform the sets of data into vectors suitable for analysis by machine learning techniques; and storing the generated vectors efficiently for retrieval. In some embodiments, the components configure the vector modeling system 150 to generate and transmit instructions causing a plurality of distributed client devices to identify vector templates and transform or otherwise convert at least a portion of a set of data distributed across the plurality of client devices into a vector format. The vector modeling system 150 is shown to include an access component 210, a template component 220, a vector component 230, a mapping component 240, a storage component 250, and a learning component 260. Any one or more of these components may be implemented using one or more processors and hence may include one or more processors (e.g., by configuring such one or more processors to perform functions described for that component).

The access component 210 accesses sets of data configured in a first format and stored on one or more devices. In some embodiments, the access component 210 accesses sets of data distributed across multiple client devices (e.g., first and second client devices). The access component 210 may access the sets of data via a network connection accessible to the vector modeling system 150 and the client devices storing the sets of data. In some embodiments, the access component 210 retrieves portions of the sets of data stored across distributed client devices to perform vector transformation processes on a joined subset of the data.

The template component 220 generates vector parameters and vector templates based on the sets of data accessed by the access component 210. In some embodiments, the template component 220 generates integrated vector templates and integrated vector parameters based on a set of data distributed across a plurality of client devices. The integrated vector templates and integrated vector parameters are configured to receive transformed versions of the sets of data for use by the vector modeling system 150. In some example embodiments, the template component 220 receives selections for transformation strategies for one or more columns to be included in integrated vectors generated in accordance with the integrated vector template and integrated vector parameters.

The vector component 230 generates vectors and vector values from sets of data accessed by the access component 210 in accordance with templates generated by the template component 220. In some example embodiments, the vector component 230 generates the vectors based on transform strategies determined for the sets of data by the template component 220 or received by the template component 220 as a selected transformation strategy. In some instances, the vector component 230 generates and transmits conversion instructions to one or more client devices on which portions of the set of data is stored. The conversion instructions cause the client devices to perform transformations according to the transform strategies identified by the template component 220.

The mapping component 240 maps data entries from the set of data to vector values to generate a conversion map. In some embodiments, the conversion map also identifies a vector position for data entries. The conversion map may be used to reference vector values and positions assigned to data entries, types of data entries, or new data entries which are similar to previously mapped entries. The conversion map may be used to create consistency across vectors generated by the vector component 230.

The storage component 250 may store conversion maps in a database accessible by the vector modeling system 150. In some embodiments, the storage component 250 stores vectors generated by the vector component 230. In storing vectors, the storage component 250 may identify and remove vector positions having predetermined values to generate modified vectors. The removal of the vector positions may compress the modified vectors for storage efficiency. Upon retrieval of the modified vectors, in some embodiments, the storage component 250 identifies removed vector positions, discarded during the storage process, and reintegrates the removed vector positions and the predetermined value.

The learning component 260 processes vectors generated by the vector component 230 using machine learning algorithms. In some embodiments, the learning component 260 identifies probabilities of event occurrences, generates predictions, and provides other interpretation functions for the vectors. The learning component 260 may perform the interpretation functions on the vectors based on the transformation of the set of data into a format distinct from the original format of the set of data.

Any one or more of the components described may be implemented using hardware alone (e.g., one or more of the processors of a machine) or a combination of hardware and software. For example, any component described in the vector modeling system 150 may physically include an arrangement of one or more processors (e.g., a subset of or among the one or more processors of the machine) configured to perform the operations described herein for that component. As another example, any component of the vector modeling system 150 may include software, hardware, or both, that configure an arrangement of one or more processors (e.g., among the one or more processors of the machine) to perform the operations described herein for that component. Accordingly, different components of the vector modeling system 150 may include and configure different arrangements of such processors or a single arrangement of such processors as different points in time. Moreover, any two or more components of the vector modeling system 150 may be logically or physically combined into a single component, and the functions described herein for a single component may be subdivided among multiple components. Furthermore, according to various example embodiments, components described herein as being implemented within a single machine, database, or device may be distributed across multiple machines, databases, or devices.

Figure 3:
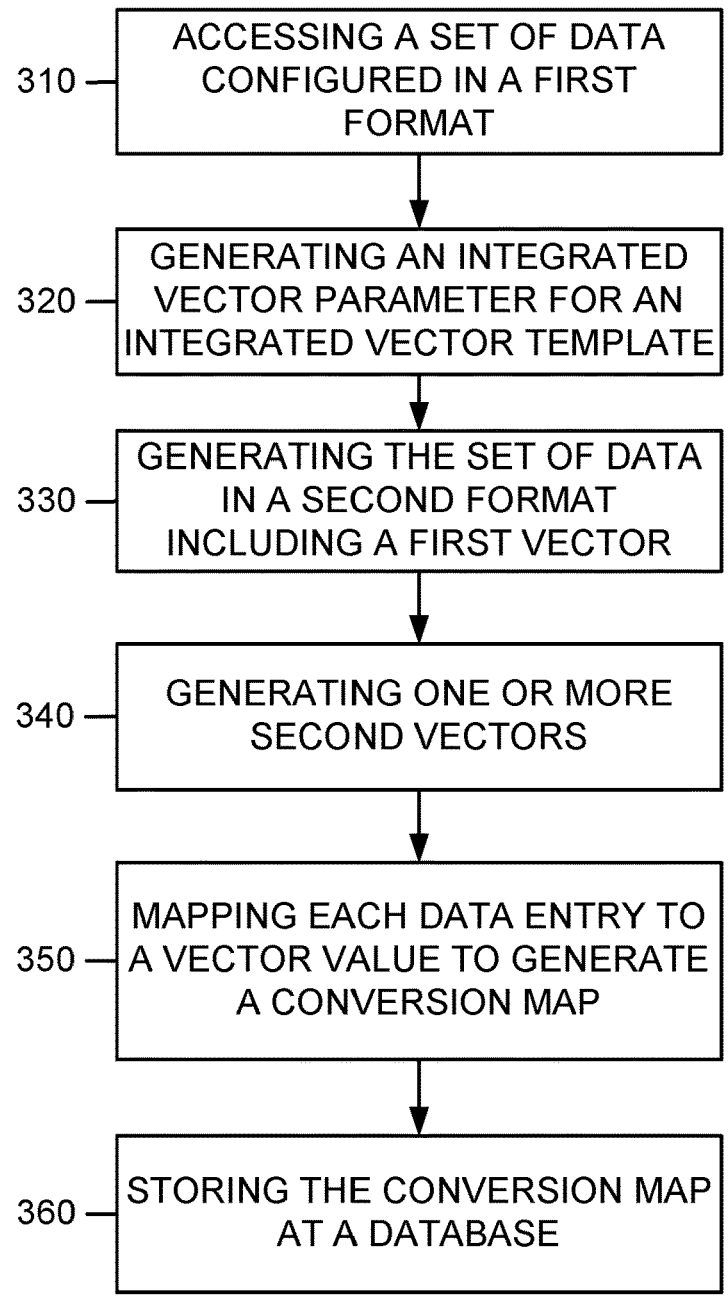
FIG. 3 is a flowchart illustrating individual operations of a method for interpreting and transforming structured data configured for processing by one or more machine learning operations, according to various example embodiments.

FIG. 3 is a flowchart illustrating operations of the vector modeling system 150 in performing a method 300 of interpreting and transforming structured data configured for processing by one or more machine learning operations, according to some example embodiments. Operations of the method 300 may be performed by the modules described above with respect to FIG. 2.

In operation 310, the access component 210 accesses a set of data configured in a first format. The set of data is stored on a first client device and a second client device. The first format may be a structured format. In some instances, the structured data format may be a data table, an EXCEL table, a structured query language (SQL), or any other suitable table having a defined form and organization for data elements inserted into the structured format. The access component 210 may access the set of data based on an access request received by the access component 210 from an input device. The access request may indicate a user desire to access data stored on one or more client device to process the data in a manner suitable to execute machine learning operations and generate predictions against the set of data. For example, where the data set includes a list of entities or individuals and characteristics for each of the entities or individuals, the access request may initiate a set of operations configured to determine predicted churn rates for the entities or individuals based on machine learning based predictions executed on the set of data.

The access component 210 may access the set of data via direct connection, wireless connection, or any other suitable manner. In some example embodiments, upon receiving user input representative of an access request, the access component 210 generates a request and transmits the request to one or more client devices (e.g., the first client device and the second client device) via a communications network, such as the Internet.

In operation 320, the template component 220 generates an integrated vector parameter for an integrated vector template. The template component 220 may generate the integrated vector template based on the set of data stored on the first client device and the second client device. The integrated vector template represents a second format into which the set of data is to be transformed, translated, or otherwise represented. In some example embodiments, the integrated vector template (e.g., the second format) is a data structure configured to incorporate data included within the data set, where data stored a one client device may differ in form or characteristics from data stored on another client device. For example, where data on a first client device includes an identification and four characteristics associated with each specified identification and data on a second client device includes an identification and five characteristics associated with each specified identification, the integrated vector template may include vector parameters suitable to receive identity values and values for five characteristics.

In some instances, the integrated vector template is a one-dimensional array having a specified number of elements or positions (e.g., the integrated vector parameter). Where the first format includes a set of rows and columns of data, the integrated vector parameter may specify enough positions to include data in any given row of the first format. The integrated vector parameter may also indicate an expected type of data for inclusion in a specified vector. For example, the expected type may be an integer value, a rational number value, a whole number value, or any other suitable value.

In some example embodiments, operation 320 may include one or more sub-operation configured to enable selection of a transformation strategy to generate vector templates and transform the set of data from the first format to a second format. In some embodiments, the template component 220 causes presentation of one or more transform elements indicating a transform strategy for converting the set of data from the first format into the second format. The one or more transform elements may be presented as a set of selectable user interface elements, such as radio buttons, a text input field, a drop down menu, or any other suitable user interface elements.

The transformation strategies may include operations configured to translate, transform, or otherwise convert data from the set of data to a representation suitable for inclusion in the integrated vector. In some embodiments, the transformation strategies include a conversion, one-hot encoding, one-of-K encoding, encoding lookup, or any other suitable transformation strategy, encoding algorithm, or encoding operations. A transformation strategy of conversion may represent a simple conversion of a number within the set of data to a number in the integrated vector. In some embodiments, the conversion ports a number directly from the set of data to the vector in a specified position. Conversion may also change the value of the number in the set of data to a different number. For example, an integer may be changed to a binary number, a series of binary numbers, or any other number capable of being included in the integrated vector.

The template component 220 receives selection of a transform element indicating a selected transform strategy associated with the transform element. The template component 220 receives the selection based on a user interacting with a user element presented at the client device. The user may interact with the user interface element by tapping a touchscreen, clicking or otherwise selecting the user interface element with a mouse or keyboard, or any other suitable user interaction with the client device or an input of the client device. The input of the client device may receive a signal indicating the interaction and pass an indication of the selected user interface element to the template component 220.

In operation 330, the vector component 230 generates the set of data in a second format. In some example embodiments, the second format is a vector in the form of a one-dimensional array having a specified number of positions or elements. As described above, the number of positions may be specified by the integrated vector parameter. The second format may be configured to include a number of positions, within the vector, to receive a value for each data element in a row of the set of data stored at the first client device or the second client device. The set of data, generated in the second format, includes one or more first vectors including vector values converted from data entries or elements stored on the first client device. The one or more first vectors are generated based on the integrated vector template such that the one or more first vectors conform to the integrated vector parameter. For example, where a row of data from the first device includes four entries associated with an identification value, a vector of the one or more first vectors may contain at least four positions to accommodate each of the four entries.

In embodiments where the template component 220 receives a selection of a transform element indicating a selected transform strategy, the vector component 230 generates the one or more first vectors based on the selected transform strategy. For example, where the selected transform strategy is a one-hot encoding strategy, the vector component 230 may generate the one value for each entry within a row. The one value may be within a predetermined value range, such as between zero and one or zero and another whole number. In some instances, a single entry may be represented in a vector position in a plurality of different first vectors of the one or more first vectors. The one value in the vector position may be fluctuate between two or more first vectors to indicate presence or absence of the entry with respect to another entry represented in the one or more first vectors.

In operation 340, the vector component 230 generates one or more second vectors including vector values converted from the data entries stored on the second client device. The one or more second vectors are generated based on the integrated vector template such that the one or more second vectors conform to the integrated vector parameter. In some example embodiments, vector component 230 generates the one or more second vectors similarly to or the same described in operation 330. In embodiments where the template component 220 receives a selection of a transform element indicating a selected transform strategy, the vector component 230 generates the one or more second vectors based on the selected transform strategy.

In various example embodiments, to perform operations 330 and 340, the access component 210 retrieves at least a portion of the set of data stored on each of the first client device and the second client device. The portion of data retrieved from the first client device and the second client device is joined to form an operable set of data from which integrated vectors are generated, as described above.

In operation 350, the mapping component 240 maps each data entry to a vector value to generate a conversion map. The conversion map may represent the data entry and one or more vectors in which the data entry is represented. The conversion map may be generated as a structured table and be used to replicate values or positions used to represent the data entry in subsequently generated vectors. In some embodiments, the conversion map comprises metadata. The metadata may be stored in the structured table and designate specified data entries (e.g., string values) to vector values, thereby forming the conversion map. For example, a set of data entries may include string values "A," "B," and "C." The conversion map associates the string values to discrete positions, such as {"A":0, "B": 1, "C": 2}.

In operation 360, the storage component 250 stores the conversion map at a database accessible by the vector modeling system 150. The conversion map indicates a mapping of vector values to data entries. In some example embodiments, the conversion map is accessible to retrieve one or more mappings of vector values and data entries to generate subsequent vectors. The storage component 250 may store the conversion map in a discrete instance or update a previously generated conversion map with changes to reflect how a given data entry, from the set of data on one or more of the first client device and the second client device, has been represented within vectors generated by the vector component 230.

Figure 4:
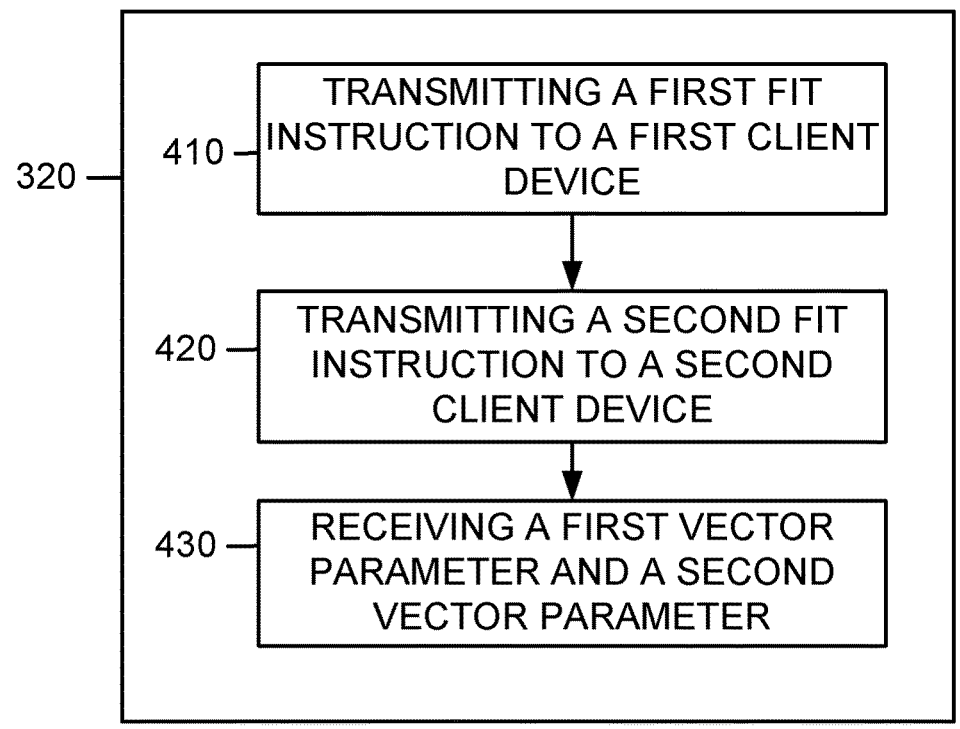
FIG. 4 is a flowchart illustrating individual operations of a method for integrating vectors representing data stored on differing client devices, according to various example embodiments.

FIG. 4 is a flowchart illustrating operations of the vector modeling system 150 in performing a method 400 of determining, generating, and integrating vectors representing data stored on differing client devices, according to some example embodiments. Operations of the method 400 may be performed by the modules described above with respect to FIG. 2. In some example embodiments, the method 400 operates as to distribute fitting and generation of modeled vectors suitable to receive data from the first client device and the second client device. The method 400 includes generating and transmitting instructions from the vector modeling system 150 which control the first client device and the second client device in performing fitting operations. In some example embodiments, the method 400 is formed as part of the operation 320.

In operation 410, the template component 220 transmits a first fit instruction to a first application on the first client device. The first fit instruction causes the first application, via the first client device, to determine a first vector parameter for a first vector template to represent the set of data stored on the first client device. The fit instruction may include processor-readable instructions which cause the first application to identify the unique values and unique combinations of data on the first client device, or accessible thereto, within the first application. The first application may also process the fit instruction to determine a layout of first vectors to be generated by the vector modeling system 150. The layout of first vectors may be the represented as a first vector template having a first vector parameter. The first vector template and the first vector parameter may be similar to the integrated vector template and the integrated vector parameter described above. In some embodiments, the first vector template and first vector parameter may be used, in part, to generate the integrated vector template and the integrated vector parameter.

The fit instruction may be processed on a set of training data distinct from the set of data being represented by vectors. The training data may include similar dimensions, values, and entries as those included in the set of data. The training data may be kept separate from the set of data to prevent the training data from leaking into the set of data being represented for analysis by machine learning techniques. In some embodiments, the fit instruction is processed on the training data to identify unique values and construct a conversion mapping, associating the unique values and specified positions. As referenced above, the training data may be distinct from data received during runtime operations. Such runtime operations may be newly generated from user input or information unavailable to the training data.

In operation 420, the template component 220 transmits a second fit instruction to a second application on the second client device. In some instances, the second fit instruction causes second application, via the second client device, to determine a second vector parameter for a second vector template to represent the set of data stored on the second client device, or accessible thereto, within the second application. The second application may also process the second fit instruction to cause determination of the second vector parameter for the second vector template. In some example embodiments, the fit second instruction transmitted to the second client device, for the second application, is the same fit instruction as that transmitted to the first client device in operation 410. The second fit instruction may cause the second application, via the second client device, to generate a second vector template having a second vector parameter. The second vector template and second vector parameter may be generated similarly to or the same as the manner described with respect to operation 410. In some embodiments, the first fit instruction and the second fit instruction are different. In some instances, the first application and the second application process a fit instruction differently, such that the first application and the second application to represent data, stored on one or more of the first client device and the second client device, in distinct ways. For example, the first application may process a fit instruction mapping each unique value of a data set to specified positions and the second application may process the same fit instruction to map one of the unique values to a specified position and map other values (e.g., infrequently occurring or infrequently accessed values) to a single specified position.

In operation 430, the template component 220 receives the first vector parameter for the first vector template and the second vector parameter for the second vector template. Upon receiving the first vector template and the second vector template, the template component 220 generates the integrated vector template by determining which of the first vector template and the second vector template contains sufficient vector positions to represent the portions of the set of data stored on both of the first client device and the second client device. The template component 220 may use the vector template, which can accommodate data entries from either the first client device or the second client device, as the integrated vector template. In some embodiments, the template component 220 generates the integrated vector template based on a combination of both the first vector template and the second vector template, to accommodate data entries stored on either the first client device or the second client device.

In some embodiments, a plurality of vector templates (e.g., the first vector template and the second vector template) may be distributed to each of a plurality of client devices (e.g., the first client device and the second client device). Differing subsets (e.g., subsets of rows of a data table) of the set of data may be distributed across the plurality of client devices. With each vector template distributed to each client device, an integrated vector may be constructed for each subset of data (e.g., rows of a data table) stored on each client device. The template component 220 may collect the integrated vectors from each client device, consolidating the vectors into a single data table.

Figure 5:
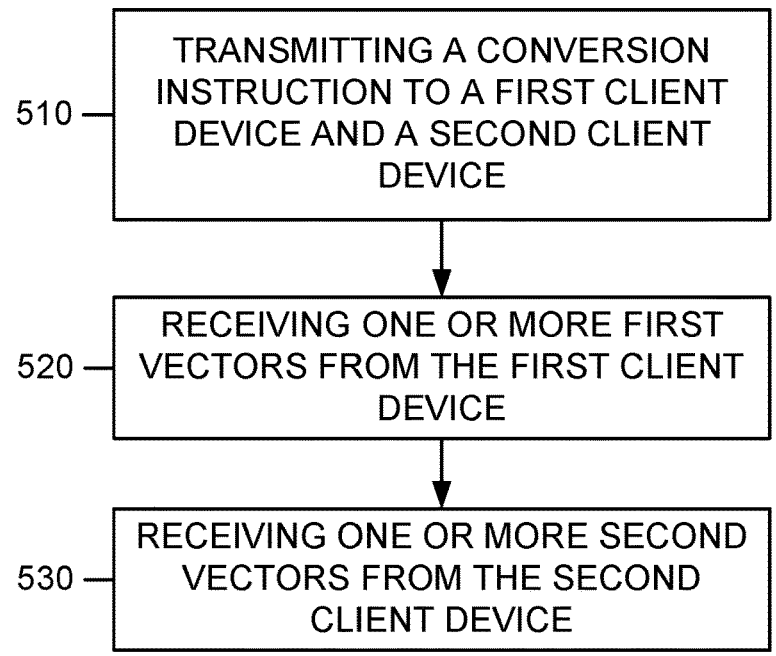
FIG. 5 is a flowchart illustrating operations of a method of distributed conversion of sets of data into vectors, according to various example embodiments.

FIG. 5 is a flowchart illustrating operations of the vector modeling system 150 in performing a method 500 of distributed conversion of sets of data into vectors, according to some example embodiments. Operations of the method 500 may be performed by the modules described above with respect to FIG. 2. As illustrated by FIG. 5, the method 500 may be performed as a sub-operation of one or more of operations 330 and 340 of method 300, as illustrated in FIG. 3. The method 500 operates to distribute conversion or transformation of sets of data, stored at the first client device and the second client device, into vectors suitable for the data set. The method 500 may include instructions or operations which cause the first client device and the second client device to perform data transformations to configure the set of data for inclusion in vectors processed by the vector modeling system 150 in a suitable format.

In operation 510, the vector component 230 transmits a conversion instruction to the first client device and the second client device. The conversion instruction causes the first client device and the second client device to identify one or more data entries included in the set of data stored on the first client device and the second client device, respectively. A data entry, of the one or more data entries, corresponds to an element in a specified position within the integrated vector template. The conversion instruction causes the first client device and the second client device to convert the data entries stored on the first client device and the second client device, respectively, into vector values. The conversion instruction may be understood as a transform operation or set of transform operations, which use a predetermined transform strategy or a selected transform strategy, to convert the one or more data entries into vector values in specified vector positions.

In some example embodiments, the conversion instruction may include a plurality of transform operations. One or more of the transform operations may be specific to a type of data or a modeling strategy (e.g., a transform strategy). For example, where a data entry is a numerical value, a transform operation for numerical values may copy or otherwise transfer the numerical value directly to a suitable position within one or more vectors. Where the data entry is a string, the transform operation may use one-hot encoding to generate an ordered list representative of the string, with the ordered list having a set of values representative of a relationship of the string with one or more data entries sharing a row with the string in the set of data. Upon generating the ordered list, the transform operation for one-hot encoding may position the values of the ordered list in a set of vectors.

In some instances, the transform operations may use one or more hashing operations to identify vector positions of the data entries. The hashing operations use a generated hash value for a specified data entry to find and assign the data entry to a position within the vector. In some instances, the hashing operations may randomly assign a vector position to a given data entry. Once a vector position has been assigned to a data entry, the vector position may be associated with the data entry. Subsequent vectors generated from the set of data by the vector modeling system 150 include the data entry assigned to the same vector position to maintain consistency between vectors generated for the set of data.

In operation 520, the vector component 230 receives, from the first client device, one or more first vectors including vector values converted from data entries stored on the first client device. Upon assignment of the data entries to positions within the vector and transforming the data entries into values included in the vector positions, the first client device may transmit the one or more first vectors generated in the operation 510 to the vector component 230. The vector component 230 may receive the one or more first vectors via a network, such as the Internet.

In operation 530, the vector component 230 receives, from the second client device, one or more second vectors including vector values converted from data entries stored on the second client device. The second client device, upon assigning and transforming the data entries to generate the one or more second vectors, may transmit the one or more second vectors to the vector component 230 via a network.

Figure 6:
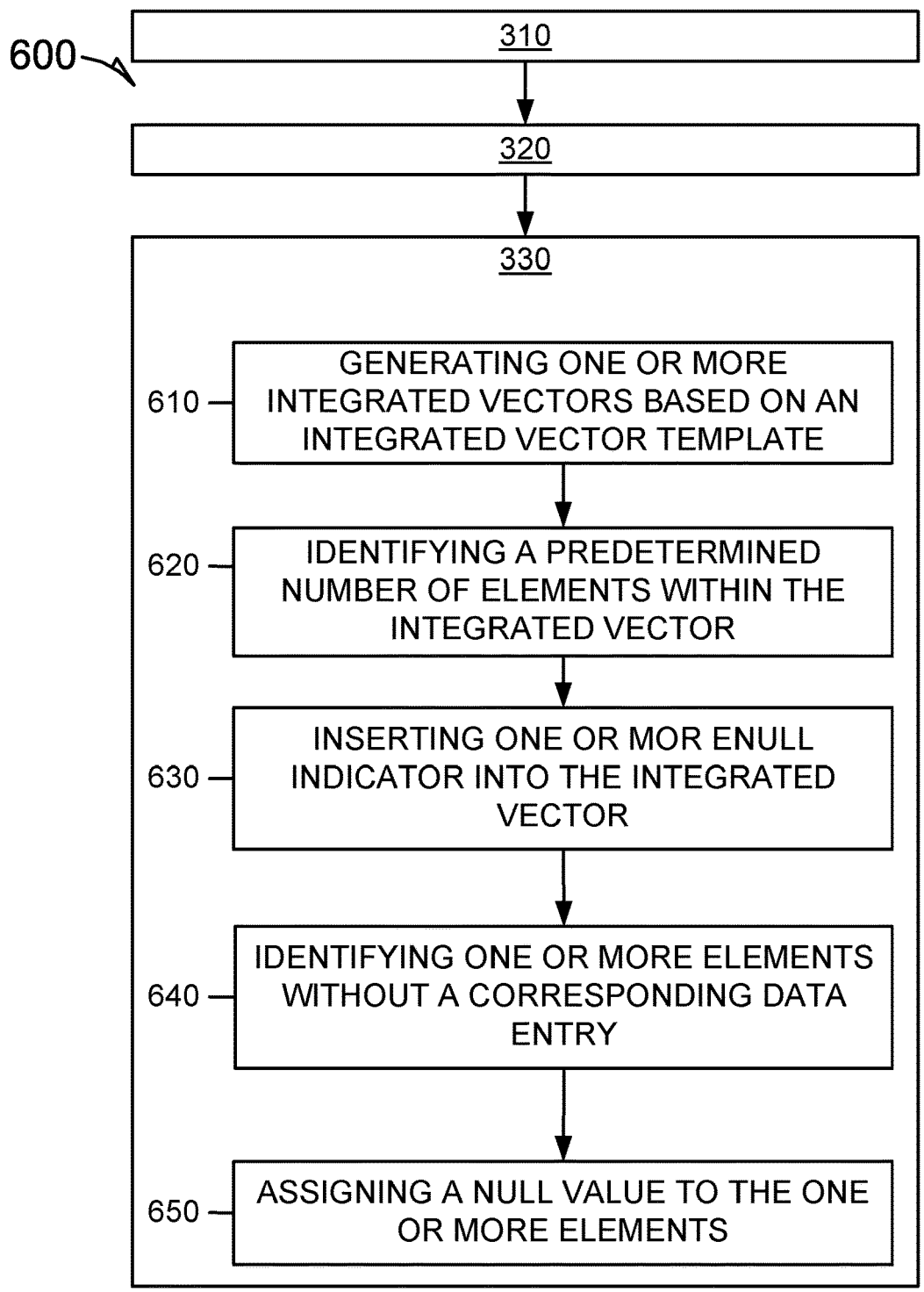
FIG. 6 is a flowchart illustrating operations of a method of reconciling vector positions lacking assigned data entries, according to various example embodiments.

FIG. 6 is a flowchart illustrating operations of the vector modeling system 150 in performing a method 600 of identifying and reconciling vector positions lacking assigned data entries, according to some example embodiments. Operations of the method 600 may be performed by the modules described above with respect to FIG. 2. As illustrated by FIG. 6, the method 600 may include operations 610, 620, 630, and 640, and may be performed subsequent to or as part of operation 330 of method 300, as illustrated in FIG. 3.

In operation 610, the vector component 230 generates one or more integrated vectors based on the integrated vector template and at least one or more of the one or more first vectors and the one or more second vectors. The vector component 230 may generate the one or more integrated vectors as described above with respect to operation 330. The integrated vector may have differing number of vector positions than the first vectors or the second vectors.

In operation 620, the vector component 230 identifies a predetermined number of elements within the one or more integrated vectors. The predetermined elements may correspond to vector positions of the integrated vectors. One or more vector positions of the integrated vector may correspond to one or more vector positions within the one or more first vectors and the one or more second vectors. The predetermined number of elements may equal the number of vector positions of the one or more integrated vectors. For example, a set of string columns of a set of data may map to a variable number of elements. In some embodiments, the number of elements is predetermined. The variable number of elements may depend on a number of unique values contained within the string columns.

In operation 630, the vector component 230 inserts one or more null indicator into the integrated vector. In some instances, the indicator is a null flag within an integrated vector. The null indicator enables one or more components of the vector modeling system 150 to differentiate between an absence of information and a predetermined value. In some instances, the null indicator enables the vector modeling system 150 to differentiate between an empty vector position and a vector position having a value of zero. The null indicator may be positioned within the integrated vector in any suitable position. In some embodiments, the null indicator is positioned proximate to (e.g., immediately preceding or following) a vector position without a corresponding data entry. In these instances, the null indicator may be positioned proximate to the empty vector position after a determination that the vector position lacks a data entry. In some example embodiments, the vector component 230 assigns the null indicator to a predetermined vector position which is consistent across a set of vector positions generated by the vector component 230.

In operation 640, the vector component 230 identifies one or more elements (e.g., vector positions) in the integrated vector without a corresponding data entry. The vector component 230 may identify the one or more empty elements based on a comparison of the integrated vector parameter and the integrated vector. The vector component 230 may determine a number of expected vector positions from the integrated vector parameter and determine whether each vector position has been populated by a transformed value derived from a data entry from the set of data. Where the vector position has not been populated by a transformed value, the vector component 230 identifies the vector position as an empty vector position.

In operation 650, the vector component 230 assigns a null value to the one or more elements in the integrated vector. In some embodiments, the null value is assigned to the empty vector positions identified within the integrated vector. The null value is associated with the one or more null indicator in the integrated vector. In some instances, the null indicator is placed within the integrated vector based on a determination that the integrated vector includes an empty vector position. In these embodiments, the null indicator indicates that one or more of the vector positions within the integrated vector are empty. Once the null value has been assigned to a vector position, the learning component 260 may differentiate or disregard the null value when performing machine learning operations on the integrated vector.

Figure 7:
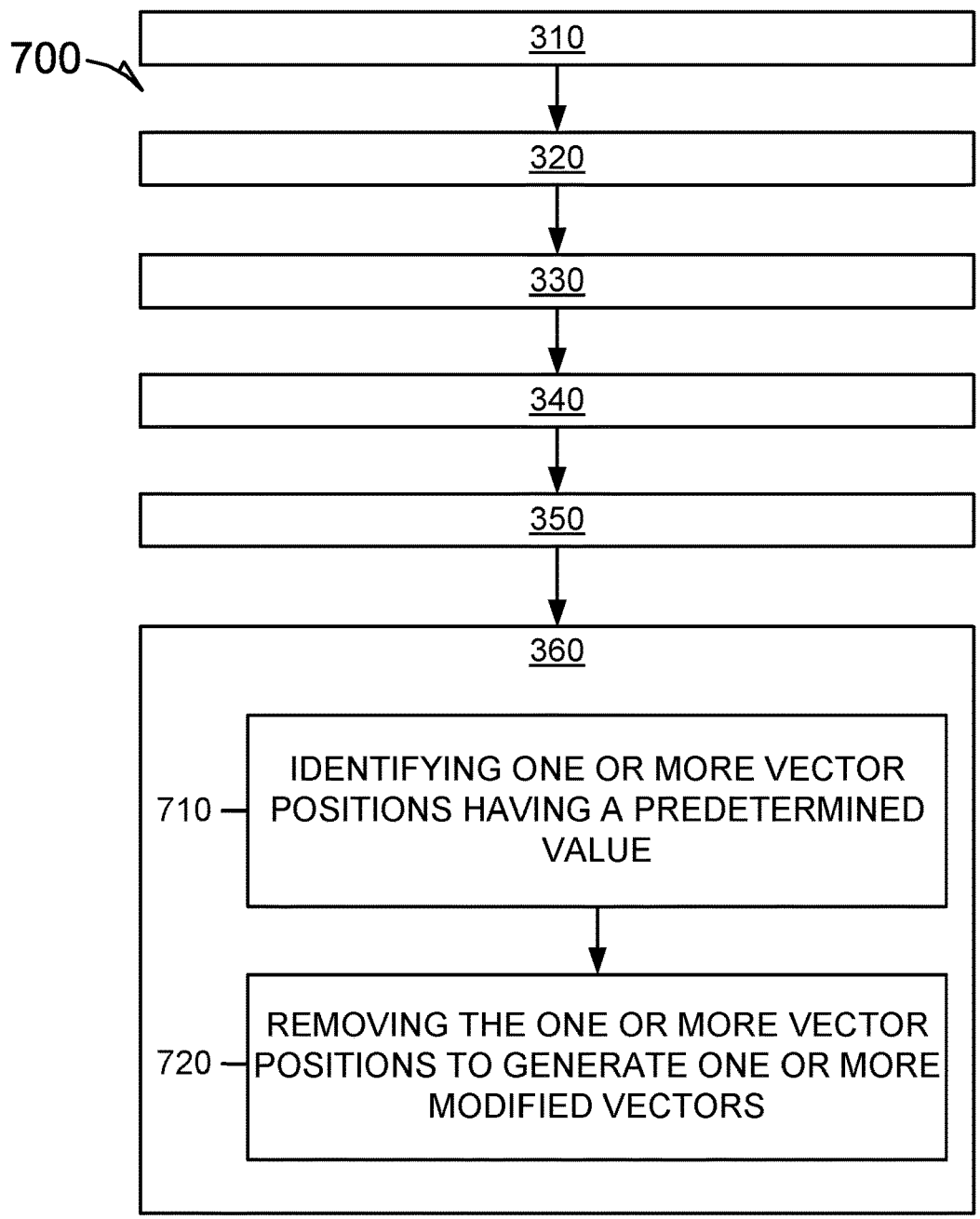
FIG. 7 is a flowchart illustrating operations of a method for storing vectors generated by the vector modeling system, according to various example embodiments.

FIG. 7 is a flowchart illustrating operations of the vector modeling system 150 in performing a method 700 of storing vectors generated by the vector modeling system 150, according to some example embodiments. Operations of the method 700 may be performed by the modules described above with respect to FIG. 2. As illustrated by FIG. 7, the method 700 may be performed subsequent to or as part of operation 360 of method 300, as illustrated in FIG. 3.

In operation 710, the storage component 250 identifies one or more vector positions within the one or more first vectors and the one or more second vectors having a predetermined value. In various example embodiments, the predetermined value may be a numerical value of zero. The predetermined value may be distinct from a null value assigned to a vector position where the null value indicates the vector position was not populated by transformed data.

In operation 720, the storage component 250 removes the one or more vector positions having the predetermined value to generate one or more modified vectors. The storage component 250 may generate the modified vectors processing the integrated vector and discarding the vector positions and the predetermined values prior to storing the vector (e.g., within a cache or random access memory). In some instances, the storage component 250 removes the one or more vector positions and predetermined values during storage of the vector by skipping or otherwise omitting the vector positions and predetermined values when writing the vector to a storage position within a non-transitory machine-readable storage medium.

In operation 730, the storage component 250 stores the one or more modified vectors in the database accessible by the vector modeling system 150. The storage component 250 may store the one or more modified vectors in any suitable write operation or set of operations, storing the one or more modified vectors within one or more storage positions in the database. In some instances, the storage component 250 stores the one or more modified vectors with an association to the integrated vector parameter. When retrieving the one or more modified vectors, the storage component 250 may identify the vector positions which were removed based on a comparison of the one or more modified vectors and the integrated vector parameter. For example, where the integrated vector parameter indicates ten vector positions for an integrated vector template and a modified vector includes four vector positions, the storage component 250 identifies six vector positions which were removed during generation of the modified vector. The storage component 250 may determine from the modified vector or a conversion map which four positions of the ten original vector positions were retained in the modified vector. The storage component 250 in retrieving the modified vector may reincorporate the six removed vector positions, according to their original position within the integrated vector template, into the modified vector and insert the predetermined value (e.g., zero) into the six removed vector positions.

Figure 8:
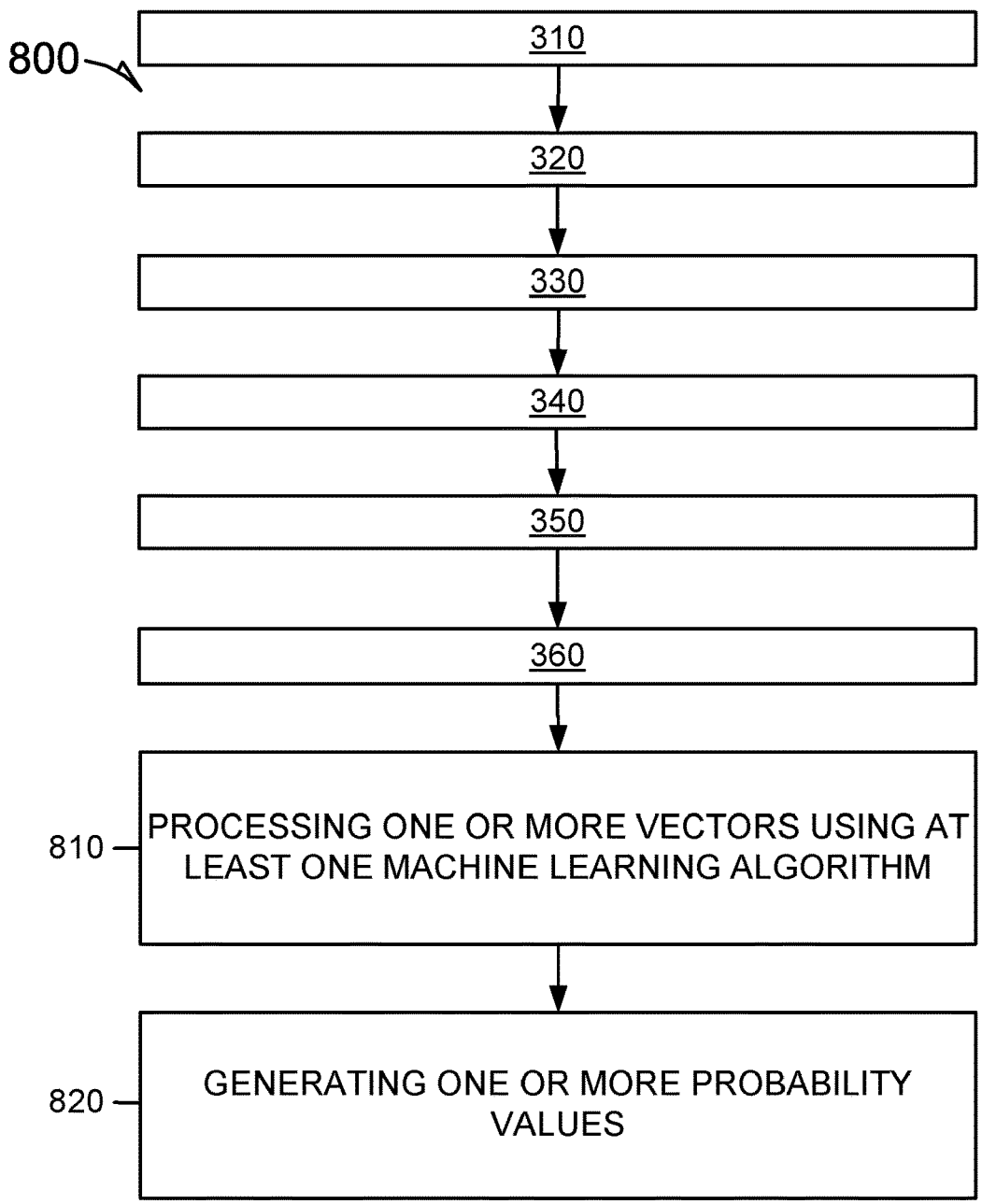
FIG. 8 is a flowchart illustrating operations of a method for generating predictions based on vectors, according to various example embodiments.

FIG. 8 is a flowchart illustrating operations of the vector modeling system 150 in performing a method 800 of generating predictions and probabilities based on vectors generated by the vector modeling system 150, according to some example embodiments. Operations of the method 800 may be performed by the modules described above with respect to FIG. 2. As illustrated by FIG. 8, the method 800 may be performed subsequent to operation 340 or 360 of method 300, as illustrated in FIG. 3.

In operation 810, the learning component 260 processes one or more vectors using at least one machine learning algorithm. The one or more vectors may be included among the one or more first vectors and the one or more second vectors. The learning component 260 may process the one or more vectors using machine learning operations or algorithms including NUMPY, machine learning library (MLlib), and any other suitable machine learning and prediction processes. In some embodiments, the learning component 260 converts a row with mixed data (e.g., numbers and strings) into numerical vectors. Each machine learning algorithm of the at least one machine learning algorithm may operate to generate one or more numerical vectors. The learning component 260 may convert, using the at least one machine learning algorithm, portions of a set of data into an intermediate representation. The intermediate representation may then be converted into a NUMPY format vector, an MLlib format vector, or any other suitable format.

In operation 820, the learning component 260 generates one or more probability values indicative of a probability of an event occurring with respect to an element included in at least one of the one or more first vectors and the one or more second vectors. Operation 820 may be performed in response to or based on processing of the one or more vectors in operation 810.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The components, methods, applications and so forth described in conjunction with FIGS. 1-8 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 9:
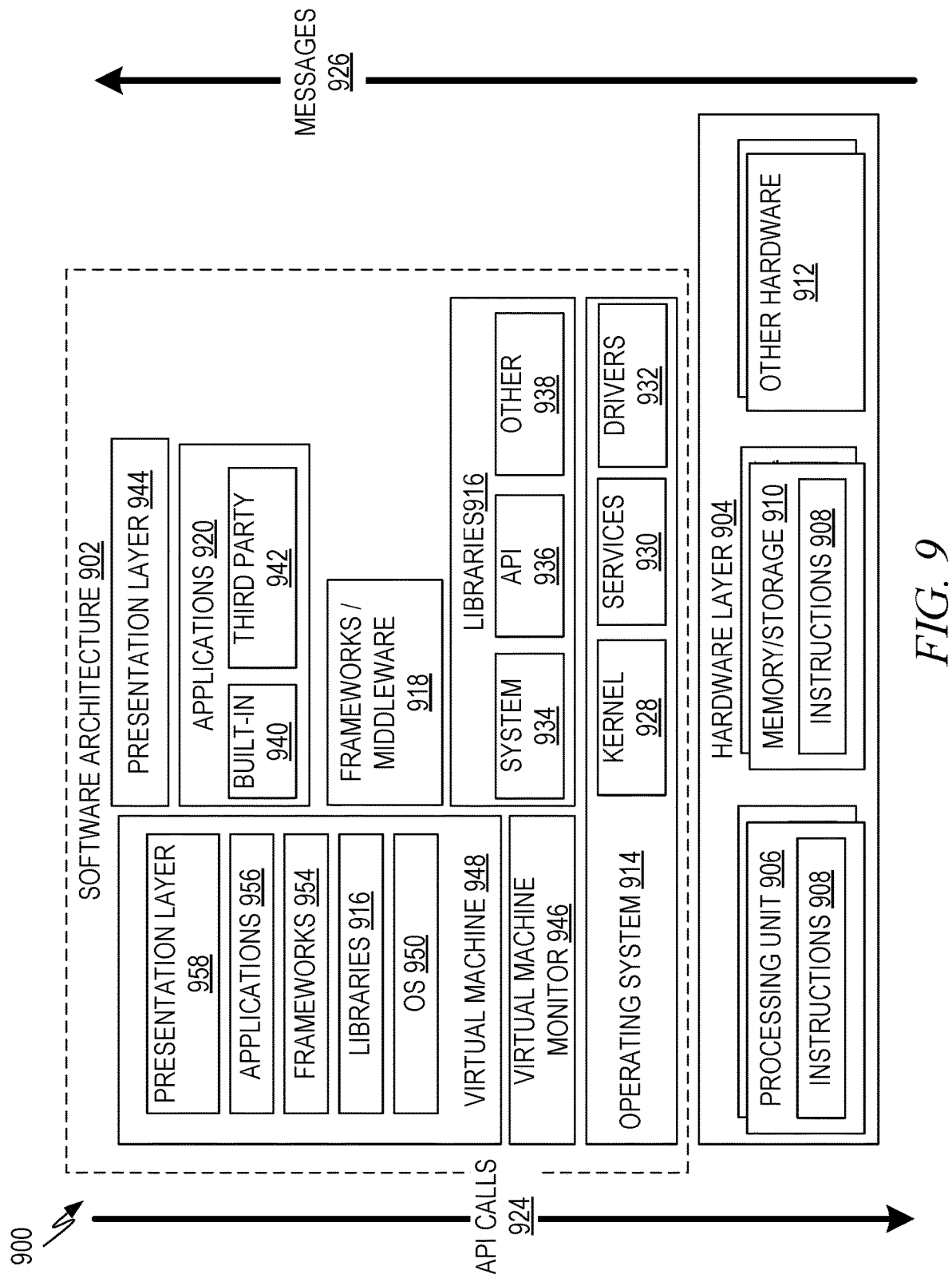
FIG. 9 is a block diagram illustrating an example of a software architecture that may be installed on a machine, according to some example embodiments.

FIG. 9 is a block diagram 900 illustrating a representative software architecture 902, which may be used in conjunction with various hardware architectures herein described. FIG. 9 is merely a non-limiting example of a software architecture and it will be appreciated that many other architectures may be implemented to facilitate the functionality described herein. The software architecture 902 may be executing on hardware such as machine 1000 of FIG. 10 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. Executable instructions 908 represent the executable instructions of the software architecture 902, including implementation of the methods, components and so forth of FIG. 2. Hardware layer 904 also includes memory and/or storage modules 910, which also have executable instructions 908. Hardware layer 904 may also comprise other hardware as indicated by 912 which represents any other hardware of the hardware layer 904, such as the other hardware illustrated as part of machine 1000.

In the example architecture of FIG. 9, the software 902 may be conceptualized as a stack of layers where each layer provides particular functionality. For example, the software 902 may include layers such as an operating system 914, libraries 916, frameworks/middleware 918, applications 920 and presentation layer 922. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), WiFi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 includes built-in applications 940 and/or third party applications 942. Examples of representative built-in applications 940 may include, but are not limited to, a contacts application, a browser application, a book reader application, a location application, a media application, a messaging application, and/or a game application. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware machine (such as the machine of FIG. 10, for example). A virtual machine is hosted by a host operating system (operating system 914 in FIG. 10) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different.

Example Machine Architecture and Machine-Readable Medium

Figure 10:
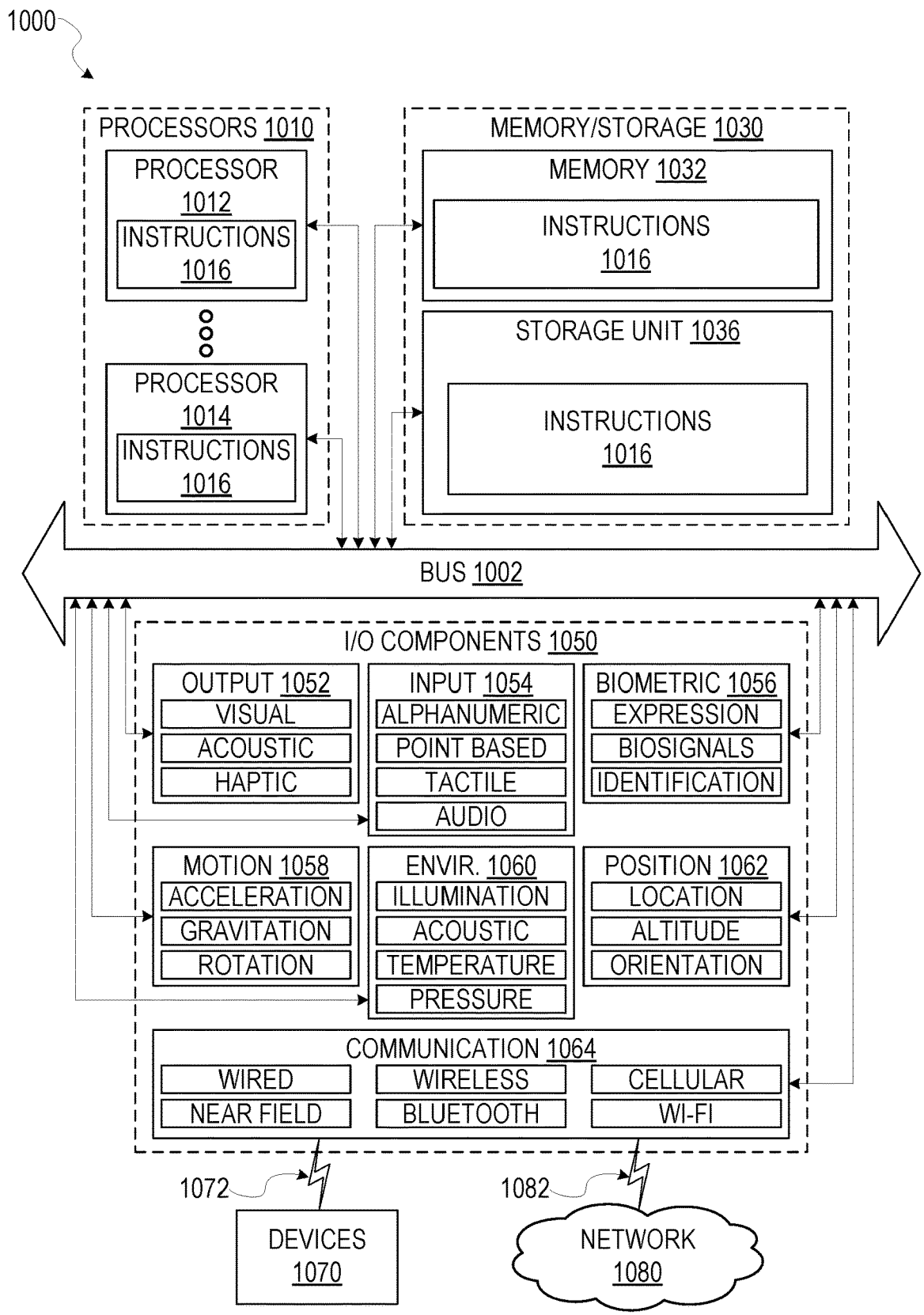
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions may cause the machine to execute the flow diagrams of FIGS. 3-5. Additionally, or alternatively, the instructions may implement the modules of FIG. 2, and so forth. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but is not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
distributing, from a server, an integrated vector template to a first client device and a second client device, the integrated vector template being generated by the server based on a first set of data provided by the first client device and a second set of data provided by the second client device, the first and second sets of data being configured in a first format;
sending, from the server to the first client device, a first conversion instruction that causes the first client device to generate the first set of data in a second format based on the integrated vector template, the first set of data in the second format comprising a first set of vectors that have one or more vector values converted from one or more data entries in the first set of data;
receiving, at the server, a first converted set of data from the first client device, the first converted set of data comprising the first set of data in the second format;
sending, from the server to the second client device, a second conversion instruction that causes the second client device to generate the second set of data in the second format based on the integrated vector template, the second set of data in the second format comprising a second set of vectors that have one or more vector values converted from one or more data entries in the second set of data;
receiving, at the server, a second converted set of data from the second client device, the second converted set of data comprising the second set of data in the second format;
mapping, by the server, each data entry in the first and second converted sets of data to a vector value to generate a conversion map, the conversion map assisting in transforming data entries, from the first or second client devices, to vector values that have a format compatible for processing by at least one machine learning algorithm;
generating, by the server, at least one subsequent vector from an additional set of data using the conversion map;
processing, by the server, the at least one subsequent vector using the at least one machine learning algorithm; and
generating a set of probability values indicative of a probability of an event occurring with respect to an element included in the at least one subsequent vector, based on the processing of the at least one subsequent vector using the at least one machine learning algorithm.

2. The method of claim 1, further comprising:
generating an integrated vector parameter for the integrated vector template by:
transmitting a first fit instruction to the first client device, the first fit instruction causing the first client device to determine a first vector parameter for a first vector template to represent the first set of data stored on the first client device within a first application;
transmitting a second fit instruction to the second client device, the second fit instruction causing the second client device to determine a second vector parameter for a second vector template to represent the second set of data stored on the second client device within a second application; and
receiving, by the server, the first vector parameter for the first vector template and the second vector parameter for the second vector template.

3. The method of claim 1, further comprising:
identifying a set of elements in the first converted set of data and the second converted set of data without a corresponding data entry; and
assigning a null value to the set of elements in the first converted set of data and the second converted set of data, the null value associated with one or more null indicators in the first converted set of data and the second converted set of data.

4. The method of claim 1, further comprising:
identifying a set of vector positions within the first set of vectors and the second set of vectors having a predetermined value;
removing the set of vector positions having the predetermined value to generate a set of modified vectors; and
storing the set of modified vectors in a database accessible by the server.

5. The method of claim 1, wherein generating the first set of vectors and the second set of vectors further comprises:
causing presentation of a set of transform elements indicating a transform strategy for converting the first set of data and the second set of data from the first format into the second format;
receiving selection of a transform element indicating a selected transform strategy associated with the transform element; and
generating the first set of vectors and the second set of vectors according to the selected transform strategy.

6. The method of claim 1, further comprising:
accessing, by the server, a first set of data provided by a first client device and a second set of data provided by a second client device.

7. The method of claim 1, further comprising:
generating, by the server, the integrated vector template based on the first set of data provided by the first client device and the second set of data provided by the second client device.

8. A computer implemented system, comprising:
one or more processors;
a non-transitory machine-readable storage medium including instructions that, when executed by the one or more processors, cause the one or more processors to perform operations comprising:
distributing an integrated vector template to a first client device and a second client device, the integrated vector template being generated by the computer implemented system based on a first set of data provided by the first client device and a second set of data provided by the second client device, the first and second sets of data being configured in a first format;
sending, to the first client device, a first conversion instruction that causes the first client device to generate the first set of data in a second format based on the integrated vector template, the first set of data in the second format comprising a first set of vectors that have one or more vector values converted from one or more data entries in the first set of data;
receiving a first converted set of data from the first client device, the first converted set of data comprising the first set of data in the second format;

sending, to the second client device, a second conversion instruction that causes the second client device to generate the second set of data in the second format based on the integrated vector template, the second set of data in the second format comprising a second set of vectors that have one or more vector values converted from one or more data entries in the second set of data;

receiving a second converted set of data from the second client device, the second converted set of data comprising the second set of data in the second format;

mapping each data entry in the first and second converted sets of data to a vector value to generate a conversion map, the conversion map assisting in transforming data entries, from the first or second client devices, to vector values that have a format compatible for processing by at least one machine learning algorithm;

generating, by the server, at least one subsequent vector from an additional set of data using the conversion map;

processing, by the server, the at least one subsequent vector using the at least one machine learning algorithm; and generating a set of probability values indicative of a probability of an event occurring with respect to an element included in the at least one subsequent vector, based on the processing of the at least one subsequent vector using the at least one machine learning algorithm.

9. The system of claim 8, wherein the operations further comprise:
generating an integrated vector parameter for the integrated vector template by:
transmitting a first fit instruction to the first client device, the first fit instruction causing the first client device to determine a first vector parameter for a first vector template to represent the first set of data stored on the first client device within a first application;
transmitting a second fit instruction to the second client device, the second fit instruction causing the second client device to determine a second vector parameter for a second vector template to represent the second set of data stored on the second client device within a second application; and
receiving the first vector parameter for the first vector template and the second vector parameter for the second vector template.

10. The system of claim 8, wherein the operations further comprise:
identifying a set of elements in the first converted set of data and the second converted set of data without a corresponding data entry; and
assigning a null value to the set of elements in the first converted set of data and the second converted set of data, the null value associated with one or more null indicators in the first converted set of data and the second converted set of data.

11. The system of claim 8, wherein the operations further comprise:
identifying a set of vector positions within the first set of vectors and the second set of vectors having a predetermined value;
removing the set of vector positions having the predetermined value to generate a set of modified vectors; and
storing the set of modified vectors in a database accessible by the computer implemented system.

12. The system of claim 8, wherein generating the first set of vectors and the second set of vectors further comprises:

causing presentation of a set of transform elements indicating a transform strategy for converting the first set of data and the second set of data from the first format into the second format;
receiving selection of a transform element indicating a selected transform strategy associated with the transform element; and
generating the first set of vectors and the second set of vectors according to the selected transform strategy.

13. The system of claim 8, wherein the operations further comprise:
accessing a first set of data provided by a first client device and a second set of data provided by a second client device.

14. The system of claim 8, wherein the operations further comprise:
generating the integrated vector template based on the first set of data provided by the first client device and the second set of data provided by the second client device.

15. A non-transitory machine-readable storage medium including instructions that, when executed by one or more processors of a machine, cause the machine to perform operations comprising:
distributing an integrated vector template to a first client device and a second client device, the integrated vector template being generated by the machine based on a first set of data provided by the first client device and a second set of data provided by the second client device, the first and second sets of data being configured in a first format;
sending, to the first client device, a first conversion instruction that causes the first client device to generate the first set of data in a second format based on the integrated vector template, the first set of data in the second format comprising a first set of vectors that have one or more vector values converted from one or more data entries in the first set of data;
receiving a first converted set of data from the first client device, the first converted set of data comprising the first set of data in the second format;
sending, to the second client device, a second conversion instruction that causes the second client device to generate the second set of data in the second format based on the integrated vector template, the second set of data in the second format comprising a second set of vectors that have one or more vector values converted from one or more data entries in the second set of data;
receiving a second converted set of data from the second client device, the second converted set of data comprising the second set of data in the second format;
mapping each data entry in the first and second converted sets of data to a vector value to generate a conversion map, the conversion map assisting in transforming data entries, from the first or second client devices, to vector values that have a format compatible for processing by at least one machine learning algorithm;
generating, by the server, at least one subsequent vector from an additional set of data using the conversion map;
processing, by the server, the at least one subsequent vector using the at least one machine learning algorithm; and
generating a set of probability values indicative of a probability of an event occurring with respect to an element included in the at least one subsequent vector, based on the processing of the at least one subsequent vector using the at least one machine learning algorithm.

16. The non-transitory machine-readable storage medium of claim 15, wherein the operations further comprise:
generating an integrated vector parameter for the integrated vector template by:
transmitting a first fit instruction to the first client device, the first fit instruction causing the first client device to determine a first vector parameter for a first vector template to represent the first set of data stored on the first client device within a first application;
transmitting a second fit instruction to the second client device, the second fit instruction causing the second client device to determine a second vector parameter for a second vector template to represent the second set of data stored on the second client device within a second application; and
receiving the first vector parameter for the first vector template and the second vector parameter for the second vector template.

17. The non-transitory machine-readable storage medium of claim 15, wherein the operations further comprise:
identifying a set of elements in the first converted set of data and the second converted set of data without a corresponding data entry; and
assigning a null value to the set of elements in the first converted set of data and the second converted set of data, the null value associated with one or more null indicators in the first converted set of data and the second converted set of data.

18. The non-transitory machine-readable storage medium of claim 15, wherein the operations further comprise:
identifying a set of vector positions within the first set of vectors and the second set of vectors having a predetermined value;
removing the set of vector positions having the predetermined value to generate a set of modified vectors; and
storing the set of modified vectors in a database accessible by the machine.

* * * * *